(12) United States Patent
Wang (10) Patent No.: US 6,798,422 B2
(45) Date of Patent: Sep. 28, 2004

(54) METHOD AND FILTERING SYSTEM FOR FILTERING EDGE DIRECTIONS

(75) Inventor: Xianglin Wang, Santa Ana, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 131 days.

(21) Appl. No.: 10/290,865

(22) Filed: Nov. 8, 2002

(65) Prior Publication Data

US 2004/0090443 A1 May 13, 2004

(51) Int. Cl.[7] .................................................. G09G 5/00
(52) U.S. Cl. ........................ 345/611; 345/613; 345/614; 345/629; 345/589; 345/592; 382/269
(58) Field of Search .......................... 382/269; 345/611, 345/613, 614, 629, 589, 592

(56) References Cited

U.S. PATENT DOCUMENTS

| | | | | |
|---|---|---|---|---|
| 4,591,844 A | * | 5/1986 | Hickin et al. | 345/614 |
| 4,704,605 A | * | 11/1987 | Edelson | 345/615 |
| 6,535,302 B1 | * | 3/2003 | Ikeda et al. | 358/3.26 |
| 6,674,903 B1 | * | 1/2004 | Cliquet | 382/199 |
| 2003/0076447 A1 | | 4/2003 | Wang et al. | |
| 2003/0095134 A1 | * | 5/2003 | Tuomi et al. | 345/611 |

OTHER PUBLICATIONS

Alleback, J.; Ping Wah Wong, "Edge–Direction Intepolation"; Image Processing, 1996, Proceedings., International Converence on vol. 3, Sep. 16–19, 1996, pp. 707–710 vol. 3.

Cox, I.J.; Boie, R.A.; Wallach, D.A., "Line Recognition", Pattern Recognition, 1990. Proceedings., 10th International Conference on Volume: i, Jun. 16–21, 1990.

Peli, E., "Feature detection algorithm based on a vital system model", Proceedings of the IEEE, vol. 90, Issue 1, Jan. 2002, pp. 78–93.

* cited by examiner

*Primary Examiner*—Matthew C. Bella
*Assistant Examiner*—Mike Rahmjoo
(74) *Attorney, Agent, or Firm*—Kenneth L. Sherman; Jeffrey P. Aiello; Myers Dawes Andras & Sherman, LLP (57) ABSTRACT

A filtering method and filtering system is applied to an edge orientation map obtained from an edge direction detection system in order to keep accurate edge directions and filter out false edges or edges with wrong directions. If an edge direction does not have a certain minimum length, then that direction is filtered out and a default direction is provided. Additional assurances can be obtained by insuring that the edge direction has a certain minimum width. If an edge direction does not have the minimum width, then that edge direction is filtered out and the default direction is provided. A direction smoother can be applied to the directions in the edge orientation map to smooth the changing of neighboring edge directions. This process is found to be effective in improving the visual quality of an image that is interpolated based on edge directions.

12 Claims, 11 Drawing Sheets

METHOD AND FILTERING SYSTEM FOR FILTERING EDGE DIRECTIONS

BACKGROUND OF THE INVENTION

FIELD OF THE INVENTION

The present invention relates to a method and a filtering system for filtering edge directions in an edge orientation map detected from an interlaced or non-interlaced scan. The filtered edge directions can then be used in an image interpolation process to preserve the smoothness of the edges in the interpolated image.

Figure 1:
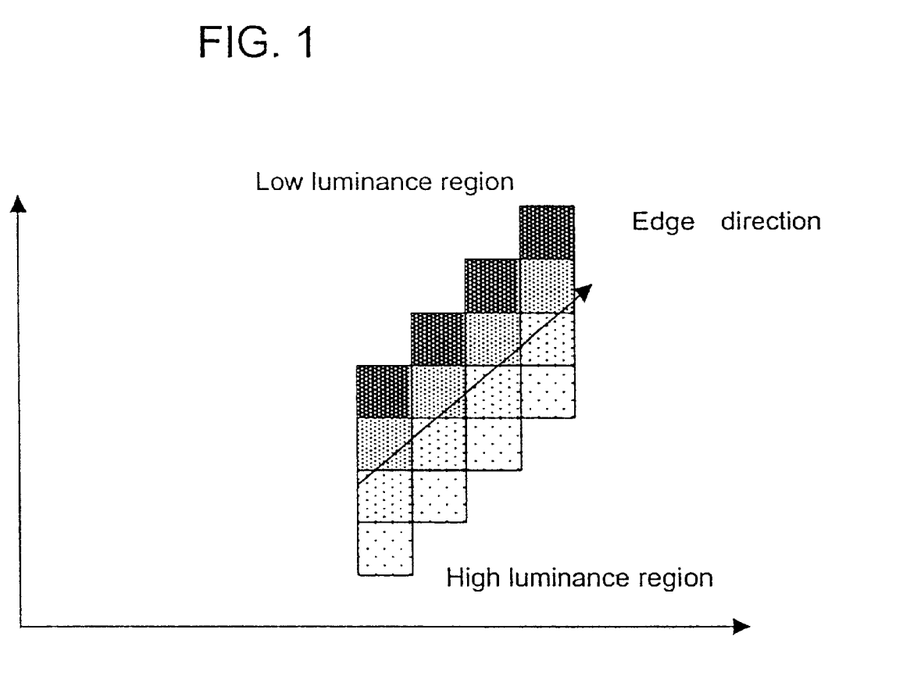
FIG. 1 is a diagram provided for explaining the definition of an edge direction.

Referring to FIG. 1, the meaning of the term "edge direction" can be seen. Along the edge direction, pixels' luminance values remain constant or change gradually, however, across the edge direction, pixels' luminance values change sharply.

Image interpolation is usually performed in both image de-interlacing and image scaling applications. There are various kinds of methods used for image interpolation. With most methods, one common problem is the degradation of edges such as the effects of serrate lines associated with the interpolated image. To overcome this problem, it is desirable to find edge directions in the image and to do image interpolation along those directions so that the smoothness of the edges can be preserved.

There have been a large number of methods published on edge detection, including edge location detection and edge direction detection. However, most edge detection methods are sensitive to image noise. In addition, the neighborhood of a given pixel in an image can have numerous cases for an edge detection method to process. As a result, it is common, if not inevitable, for an edge detection system to provide a certain percentage of false edge locations or wrong edge directions.

Meanwhile, the accuracy of the edge directions serves a crucial role when the directions are used in image applications such as de-interlacing or scaling. In edge direction based image de-interlacing, the edge direction may be detected at the position of each pixel to be interpolated. Then for edge pixels, interpolation can be performed along the edge directions to preserve the smoothness of the edges in the interpolated image. The same idea can be applied to image scaling as well. However, in these applications if a detected edge is false or if the edge direction is not correct, obvious error may be introduced into the interpolated image. Therefore, when edge directions are utilized in these kinds of applications, false edges or edges with wrong directions must be excluded before the edge information is used.

SUMMARY OF THE INVENTION

It is accordingly an object of the invention to provide a method and a filtering system for filtering edge directions, which overcome the above-mentioned disadvantages of the prior art methods and apparatus of this general type.

In particular, it is an object of the invention to provide a filtering method that can be applied to an edge orientation map obtained from an edge direction detection system. The filtering method should keep accurate edge directions and filter out false edges or edges with wrong directions.

To accomplish the object of the invention, a direction length filter is provided for performing a direction length filtering process. The direction length filter is used to filter the edge direction along the direction indicated by the edge direction. Along the current direction, neighboring edge directions are checked to see whether their orientations are similar to the current direction being checked. If the neighboring directions have very different orientations from the current direction, the current direction is filtered out. The assumption for this filtering is that a valid edge direction should be able to be extended and should therefore have a certain minimum length.

A direction width filter for performing a direction width filtering process may also be provided. The width of a direction in an edge orientation map is defined as the number of consecutive neighboring positions along the horizontal direction where the edge directions are close to the current one. The direction width filter is used to filter out edge directions in the edge orientation map that are too thin. If along the horizontal direction there are a certain minimum number of consecutive neighboring edge directions that have similar orientations to the current one, then the current direction is kept. Otherwise, the current direction is filtered out.

A direction smoother for performing a direction smoothing process may also be provided. The direction smoother is basically a low pass filter. When the direction smoother is applied to directions in an edge orientation map, the filter can smooth the changing of neighboring edge directions. This process is found to be effective in improving the visual quality of an image that is interpolated based on edge directions.

With the foregoing and other objects in view there is provided, in accordance with the invention, a method for filtering an edge direction. The method includes steps of: in a given row in an edge orientation map, selecting a given pixel having an edge direction; finding neighboring upper pixels having neighboring upper edge directions for the given pixel by traversing along the edge direction of the given pixel from the given pixel to a neighboring upper row of the edge orientation map; finding neighboring lower pixels having neighboring lower edge directions for the given pixel by traversing along the edge direction of the given pixel from the given pixel to a neighboring lower row of the edge orientation map; determining whether the edge direction of the given pixel can be extended to the neighboring upper row by checking an orientation similarity between the edge direction of the given pixel and the neighboring upper edge directions; determining whether the edge direction of the given pixel can be extended to the neighboring lower row by checking an orientation similarity between the edge direction of the given pixel and the neighboring lower edge directions; if the edge direction of the given pixel can be extended to both the neighboring upper row and the neighboring lower row, then assuming that the edge direction of the given pixel is valid; if the edge direction of the given pixel cannot be extended to the neighboring lower row, but the edge direction of the given pixel can be extended to one of the neighboring upper pixels, and a neighboring upper edge direction at the one of the neighboring upper pixels can be extended to a further neighboring upper row of the edge orientation map, then assuming that the edge direction of the given pixel is valid; if the edge direction of the given pixel cannot be extended to the neighboring upper row, but the edge direction of the given pixel can be extended to one of the neighboring lower pixels, and a neighboring lower edge direction at the one of the neighboring lower pixels can be extended to a further neighboring lower row of the edge orientation map, then assuming that the edge direction of the given pixel is valid; and otherwise, assuming that the edge direction of the given pixel is not valid.

In accordance with an added feature of the invention, the edge direction of the given pixel (x,y) is represented by d(x,y), and the step of finding the neighboring upper pixels includes using equations:

$$f(x,y)=d(x-2,c_u(x,y)),$$

$$f_l(x,y)=d(x-2,c_u(x,y)-1), \text{ and}$$

$$f_r(x,y)=d(x-2,c_u(x,y)+1), \text{ where } c_u(x,y)=y+d(x,y)*2.$$

In addition, the step of finding the neighboring lower pixels includes using equations:

$$g(x,y)=d(x+2,c_d(x,y)),$$

$$g_l(x,y)=d(x+2,c_d(x,y)-1), \text{ and}$$

$$g_r(x,y)=d(x+2,c_d(x,y)+1), \text{ where } c_d(x,y)=y-d(x,y)*2.$$

In accordance with an additional feature of the invention, the step of checking the orientation similarity between the edge direction of the given pixel and the neighboring upper edge directions includes:

a) defining a checking function chkup(x,y) as follows:

$$chkup(x,y) = \begin{cases} 1 & \text{if } |d(x,y)-f(x,y)| \leq T_1 \text{ or} \\ & |d(x,y)-f_l(x,y)| \leq T_1 \text{ or} \\ & |d(x,y)-f_r(x,y)| \leq T_1 \\ 0 & \text{otherwise} \end{cases}$$

b) concluding that the edge direction of the given pixel can be extended to the neighboring upper row if chkup(x,y) equals one; and the step of checking the orientation similarity between the edge direction of the given pixel and the neighboring lower edge directions includes:

a) defining a checking function chkdn(x,y) as follows:

$$chkdn(x,y) = \begin{cases} 1 & \text{if } |d(x,y)-g(x,y)| \leq T_1 \text{ or} \\ & |d(x,y)-g_l(x,y)| \leq T_1 \text{ or} \\ & |d(x,y)-g_r(x,y)| \leq T_1 \\ 0 & \text{otherwise} \end{cases}$$

b) concluding that the edge direction of the given pixel can be extended to the neighboring lower row if chkdn(x,y) equals one.

Here, $T_1$ is a threshold value chosen to be greater than zero and small enough to verify correlations of neighboring edge directions, but not small enough such that slightly different directions will remain.

In accordance with another feature of the invention, the method includes:

defining a checking function chkup2(x,y) as:

$$chkup2(x,y) = \begin{cases} 1 & \text{if } (|d(x,y)-f(x,y)| \leq T_1 \text{ and } chkup(x-2,c_u(x,y))=1) \text{ or} \\ & (|d(x,y)-f_l(x,y)| \leq T_1 \text{ and } chkup(x-2,c_u(x,y)-1)=1) \text{ or} \\ & (|d(x,y)-f_r(x,y)| \leq T_1 \text{ and } chkup(x-2,c_u(x,y)+1)=1) \\ 0 & \text{otherwise} \end{cases}$$

defining a checking function chkdn2(x,y) as:

$$chkdn2(x,y) = \begin{cases} 1 & \text{if } (|d(x,y)-g(x,y)| \leq T_1 \text{ and } chkdn(x+2,c_d(x,y))=1) \text{ or} \\ & (|d(x,y)-g_l(x,y)| \leq T_1 \text{ and } chkdn(x+2,c_d(x,y)-1)=1) \text{ or} \\ & (|d(x,y)-g_r(x,y)| \leq T_1 \text{ and } chkdn(x+2,c_d(x,y)+1)=1) \\ 0 & \text{otherwise} \end{cases}$$

if the checking function chkup2(x,y) takes a value of one, concluding that the neighboring upper edge direction at the one of the neighboring upper pixels can be extended to the further neighboring upper row of the edge orientation map; and if the checking function chkdn2(x,y) takes a value of one, concluding that the neighboring lower edge direction at the one of the neighboring lower pixels can be extended to the further neighboring lower row of the edge orientation map.

In accordance with a further feature of the invention, if the edge direction of the given pixel is within a threshold value from two horizontally neighboring directions in the given row, then a final conclusion is made that the edge direction of the given pixel is valid.

In accordance with a further added feature of the invention, the method includes: checking a width of the edge direction of the given pixel by determining an orientation similarity between the edge direction of the given pixel and two horizontally neighboring directions in the given row.

In accordance with a further additional feature of the invention, the edge direction of the given pixel (x,y) is represented by d(x,y); and the step of checking the width of the edge direction of the given pixel includes using equations:

$$\max(|d(x,y)-d(x,y-1)|,|d(x,y+1)-d(x,y)|) \leq T_2,$$

$$\max(|d(x,y)-d(x,y-1)|,|d(x,y-1)-d(x,y-2)|) \leq T_2, \text{ and}$$

$$\max(|d(x,y+1)-d(x,y)|,|d(x,y+2)-d(x,y+1)|) \leq T_2.$$

Here, $T_2$ is a threshold value chosen to be greater than zero and small enough to verify correlations of neighboring edge directions, but not small enough such that slightly different directions will remain.

In accordance with yet an added feature of the invention, the method includes: performing a filtering process to smooth a transition between neighboring edge directions.

In accordance with yet an additional feature of the invention, the method includes: using a three-tap filter for the filtering process; and implementing the three-tap filter using equation: $d_s(x,y)=(d(x,y-1)+2*d(x,y)+d(x,y+1))/4$. Here, $d_s(x,y)$ is a filtered output direction.

With the foregoing and other objects in view there is also provided, in accordance with the invention, an edge direction filtering system including: a direction length filter for extending a current edge direction to neighboring upper rows and to neighboring lower rows in an edge orientation map. The direction length filter is for checking an orientation similarity between the current edge direction and neighboring edge directions located along the current edge direction. The direction length filter indicates that the current edge direction is valid if the current edge direction can be extended to a certain number of neighboring rows in the edge orientation map.

In accordance with an added feature of the invention, a direction width filter is provided for filtering the current edge direction along a horizontal direction. The direction width filter is for checking an orientation similarity between the current edge direction and neighboring edge directions on a row with the current edge direction in an edge orientation map. The direction width filter indicates that the current edge direction is valid if a certain number of consecutive ones of the neighboring edge directions on the row with the current edge direction have a similar orientation to the current edge direction.

In accordance with a concomitant feature of the invention, a low pass filter is provided for smoothing transitions between horizontally neighboring edge directions of the edge orientation map.

DESCRIPTION OF THE PREFERRED EMBODIMENTS

Figure 5:
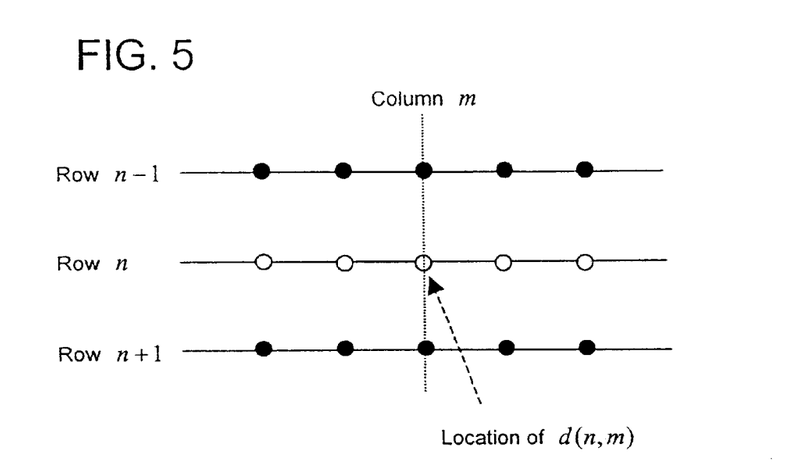
FIG. 5 is a diagram showing the locations for edge detection in an image de-interlacing application.

In this specification, $\{d(\bullet,\bullet)\}$ denotes an edge direction detected in an image produced by an interlaced or non-interlaced scan operation. In an image de-interlacing application, the edge directions are detected at the position of each pixel that will be interpolated. This case is shown in FIG. 5 where $d(n,m)$ denotes the direction at the position of pixel $(n,m)$. The black pixels are the ones available in the current field and the white pixels are the ones that will be interpolated. Based on the edge direction at the position of each white pixel, interpolation is performed along that direction. For each field of video, all of the edge directions represented by $\{d(\bullet,\bullet)\}$ constitute an edge orientation map.

Figure 6:
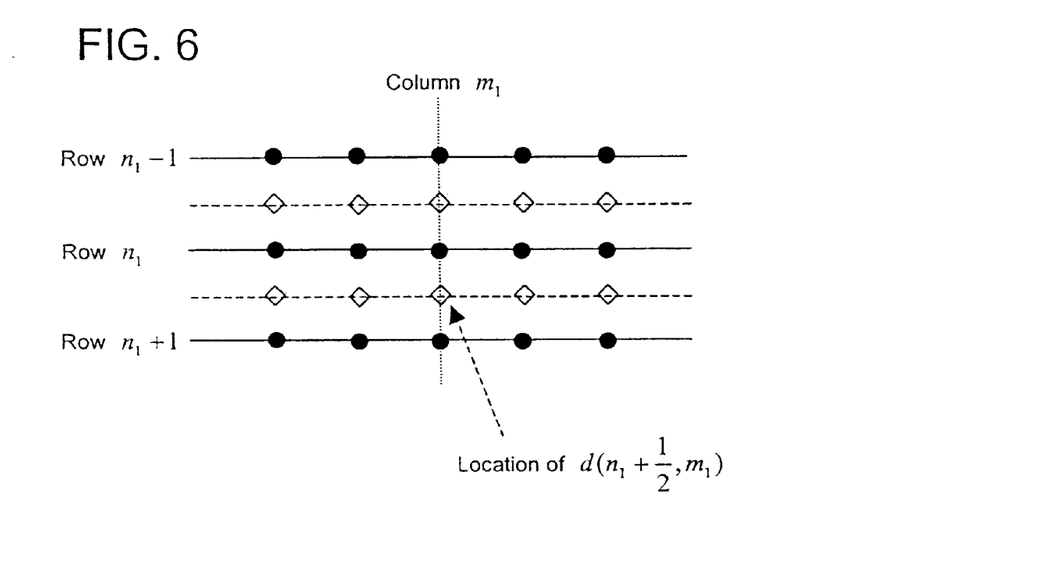
FIG. 6 is a diagram showing the locations for edge detection in an image scaling application.

A similar method can be applied to image scaling applications as well. For instance, edge directions can be detected between neighboring rows as shown at each location marked with an "◇" in FIG. 6. All of the directions detected constitute an edge orientation map. For an arbitrary position that will be interpolated, the edge direction at that location can be obtained by interpolating in the edge orientation map. Based on that direction, the image interpolation is accordingly performed.

For the kind of applications mentioned above, the accuracy of the edge directions is crucial to the overall system performance. Since image interpolation is done along the edge direction at each location, obvious error may be introduced if the edge direction is wrong or inaccurate. Therefore, edge direction filtering is important so that wrong or inaccurate directions can be removed from the edge orientation map before the map is used for interpolation.

For simplicity, the following description of the invention is based on an edge orientation map generated from an image de-interlacing application. But the described procedures can be applied to an edge orientation map generated from an image scaling application as well.

Figure 7:
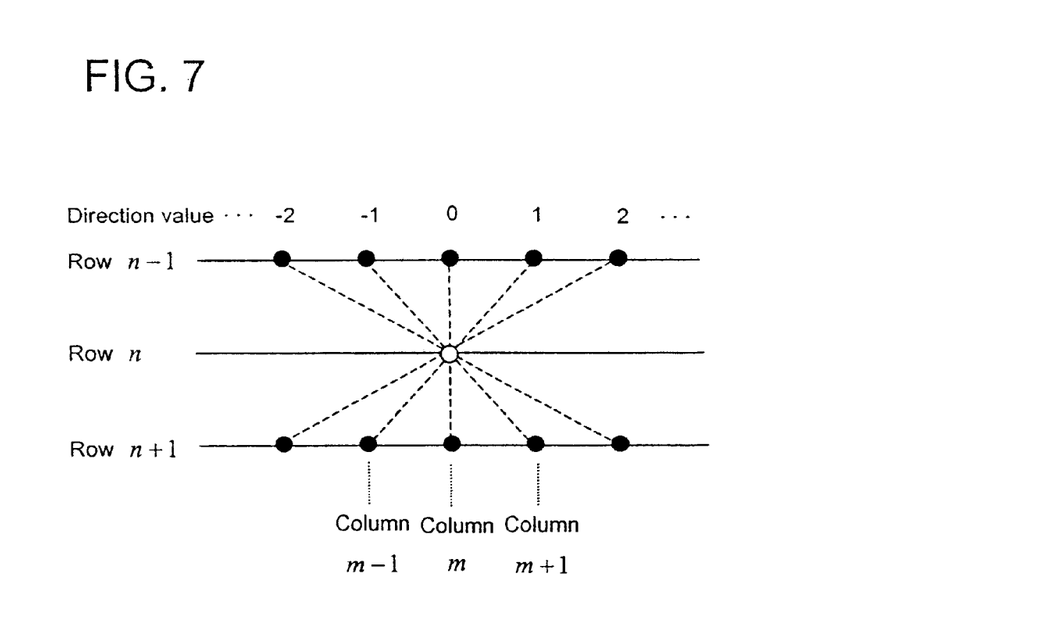
FIG. 7 is a diagram for illustrating a numbering method for indicating directions with different orientations.

The edge orientation map is represented by assigning a different value to each direction with a different orientation. Neighboring directions have neighboring values. The direction numbering method is shown in FIG. 7. The vertical direction is assigned a value of zero. For a non-vertical direction, its value is associated with the number of pixels shifted from the vertical direction on the upper row or lower row of the current pixel. For example, the direction connecting pixel $(n+1, m-1)$ and pixel $(n-1,m+1)$ is assigned a value of 1. The direction connecting pixel $(n-1,m-1)$ and pixel $(n+1,m+1)$ is assigned a value of $-1$. In a general form, the direction connecting pixel $(n+1,m-i)$ and pixel $(n-1,m+i)$ is assigned a value of i. Here i can take both positive and negative values.

Once an incorrect direction is filtered out, no edge direction information should be used for interpolation at that location. In such a case, interpolation may be performed along the vertical direction. Therefore, the vertical direction can be considered as a default interpolation direction.

Figure 2:
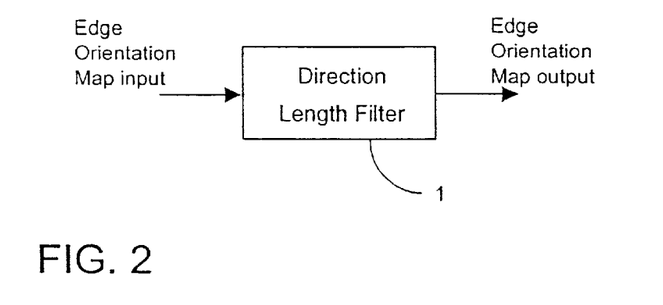
FIG. 2 is a block diagram of a first embodiment of the invention that includes a direction length filter.

As shown in FIG. 2, the first embodiment of the invention only consists of a Direction Length Filter 1 that performs a direction length filtering process. The assumption underlying the direction length filtering is that there should be some consistency between the current direction and its neighboring directions along the edge, i.e., a valid edge should have a certain length along its own direction. If the length is too short, it's likely that this edge may belong to some local tricky areas of the image and the detected direction of the edge may not be reliable. In this case, it's safer not to use this edge direction for interpolation. Meanwhile, the human visual system tends to be less sensitive to edge degradation in such tricky areas, so it's reasonable to simply use vertical interpolation in those areas.

In this invention, the length requirement for a valid edge is defined as: being able to extend the edge along at least three rows in the edge orientation map. To further clarify the length requirement, some functions are defined as follows:

$$f(x,y)=d(x-2,c_u(x,y)) \tag{1}$$

$$g(x,y)=d(x+2,c_d(x,y)) \tag{2}$$

Here, d(x,y) is the edge direction value at the position of pixel (x,y). Functions $c_u(x,y)$ and $c_d(x,y)$ are defined in equations (3) and (4) as:

$$c_u(x,y)=y+d(x,y)*2 \quad (3)$$

$$c_d(x,y)=y-d(x,y)*2 \quad (4)$$

Figure 8:
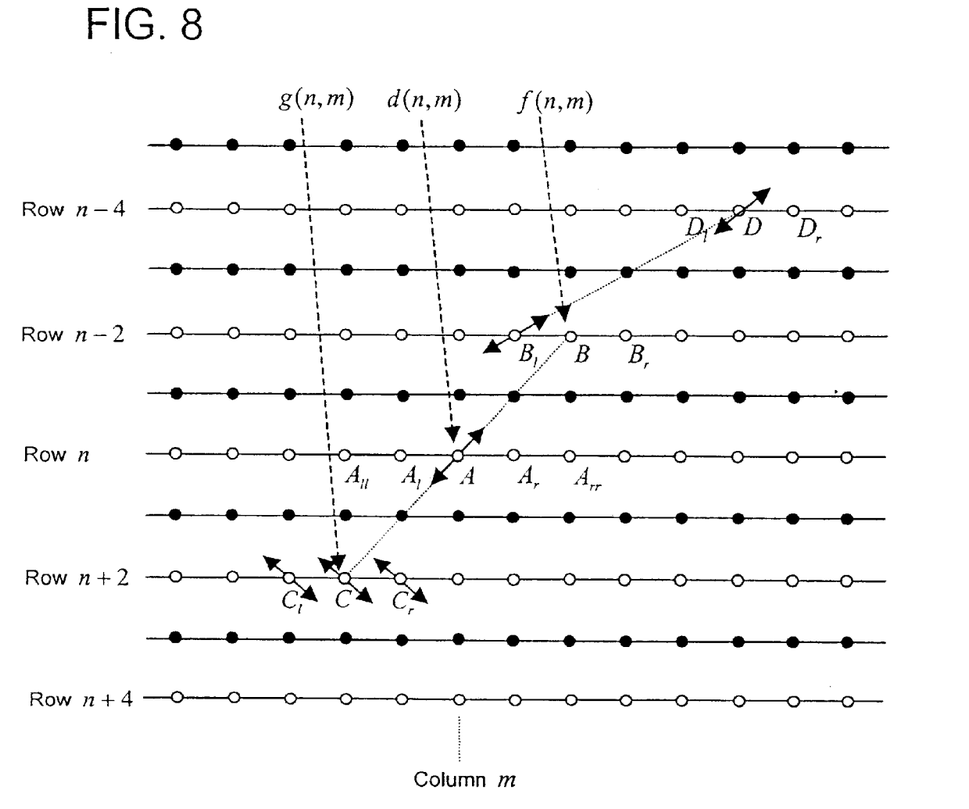
FIG. 8 is a diagram showing an example of the direction filtering process.

As shown in FIG. 8, the current pixel is denoted as "A". The edge direction at "A" is $d_A=d(n,m)$. In the example, $d_A=1$. Along the direction of $d_A$, the neighboring directions in the edge orientation map are located at "B" and "C". According to the definitions in (3) and (4), it can be seen that $(n-2,c_u(n,m))$ is actually the position of "B" and $(n+2,c_d(n,m))$ is the position of "C". Therefore, according to equations (1) and (2), $f(n,m)$ and $g(n,m)$ represent the edge directions at "B" and "C" respectively, i.e. $d_B=f(n,m)$ and $d_C=g(n,m)$.

Based on equations (1) and (2), the following functions can also be defined:

$$f_l(x,y)=d(x-2,c_u(x,y)-1) \text{ and } f_r(x,y)=d(x-2,c_u(x,y)+1) \quad (5)$$

$$g_l(x,y)=d(x+2,c_d(x,y)-1) \text{ and } g_r(x,y)=d(x+2, c_d(x,y)+1) \quad (6).$$

Obviously, $f_l(n,m)$ is the direction located to the left of $f(n,m)$ and $f_r(n,m)$ is the direction located to the right of $f(n,m)$. In FIG. 8, "$B_l$" and "$B_r$" are the positions at the left and right of "B" respectively. Therefore, $d_{Bl}=f_l(n,m)$ and $d_{Br}=f_r(n,m)$. In a same way, we also have $d_{Cl}=g_l(n,m)$ and $d_{Cr}=g_r(n,m)$.

Based on the above function definitions, two direction checking functions can be defined. One of them is used for checking direction consistency on the immediate upper row relative to the current position in the edge orientation map. The other is used for checking direction consistency on the immediate lower row relative to the current position in the edge orientation map. The two checking functions are named as chkup(x,y) and chkdn(x,y) respectively.

In the chkup(x,y) function, when any of the following three conditions shown in (7)~(9) is true, it's said that there is direction consistency for the current direction in its immediate upper row.

$$|d(x,y)-f(x,y)| \leq T_1 \quad (7)$$

$$|d(x,y)-f_l(x,y)| \leq T_1 \quad (8)$$

$$|d(x,y)-f_r(x,y)| \leq T_1 \quad (9)$$

Figure 9:
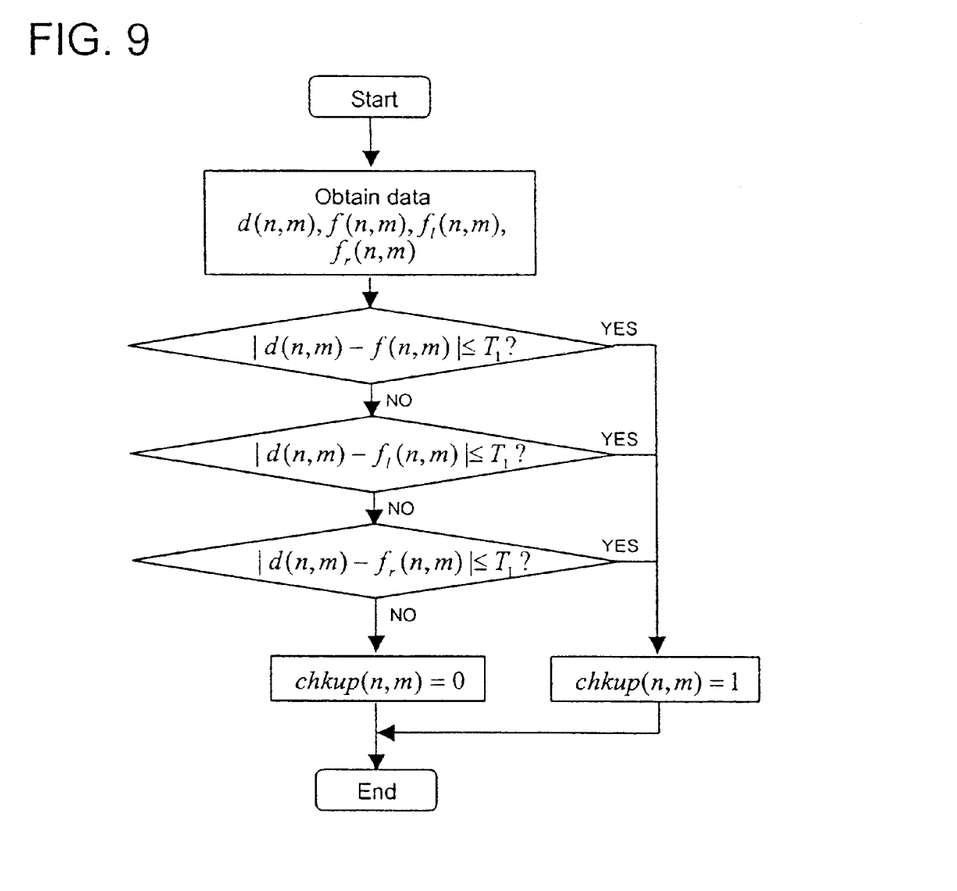
FIG. 9 is a flowchart of the chkup process used to determine whether a direction can be extended to its immediate upper row in an edge orientation map.

The flowchart of this checking process is shown in FIG. 9. The chkup(x,y) function shown in FIG. 9 can be expressed as equation (10):

$$chkup(x, y) = \begin{cases} 1 & \text{if any of (7), (8), or (9) is true} \\ 0 & \text{otherwise.} \end{cases} \quad (10)$$

$T_1$ is a threshold value that is greater than zero. When $T_1$ takes a small value, it requires that the neighboring edge directions shown in (7), (8) or (9) have very similar orientations to each other. If $T_1$ equals zero, it requires that the neighboring edge directions have exactly the same orientation. The value of $T_1$ should be chosen in a way such that it's small enough to verify correlations of neighboring edge directions, but not too small to allow slightly different directions to remain.

If chkup(x,y) takes a value of one, it's said that the direction d(x,y) can be extended to its neighboring upper row in the edge orientation map. Similarly, in the chkdn(x,y) function, when any of the following three conditions shown in (11)~(13) is true, it's said that there's direction consistency for the current direction in its immediate lower row.

$$|d(x,y)-g(x,y)| \leq T_1 \quad (11)$$

$$|d(x,y)-g_l(x,y)| \leq T_1 \quad (12)$$

$$|d(x,y)-g_r(x,y)| \leq T_1 \quad (13).$$

Figure 10:
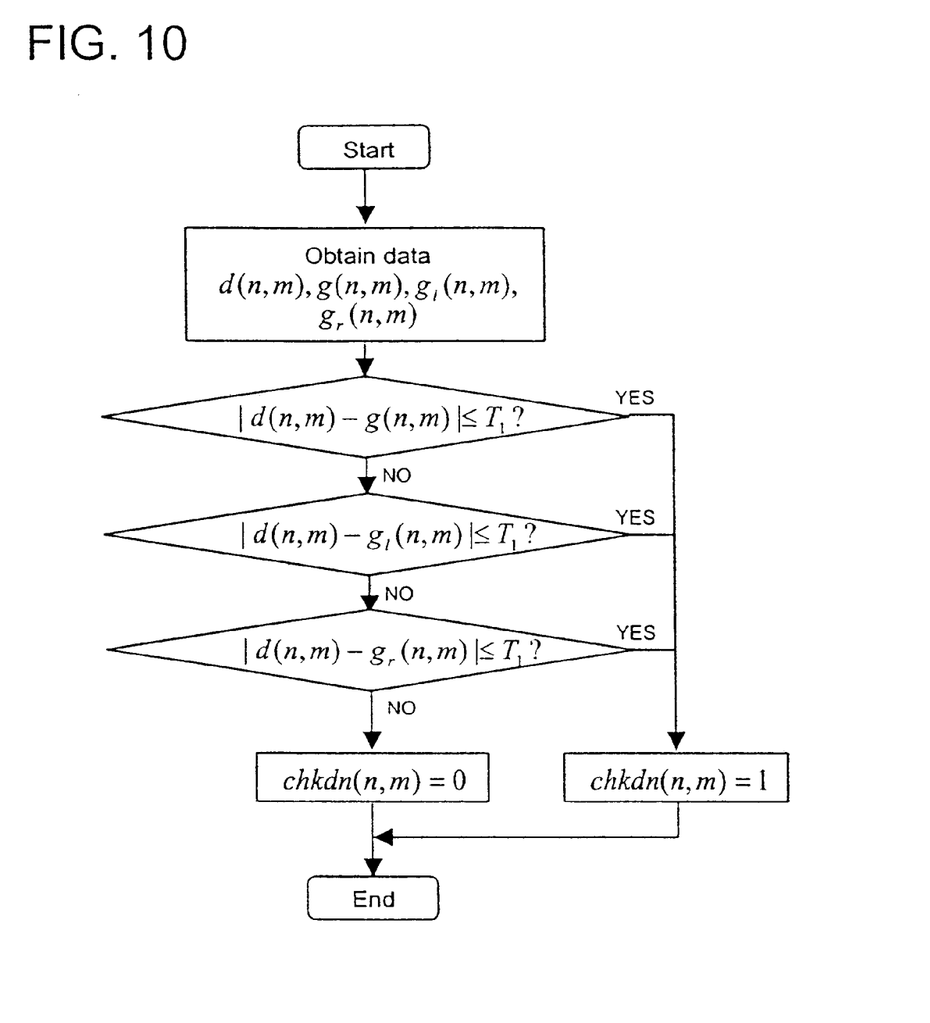
FIG. 10 is a flowchart of the chkdn process used to determine whether a direction can be extended to its immediate lower row in an edge orientation map.

The flowchart of this checking process is shown in FIG. 10. The chkdn(x,y) function shown in FIG. 10 can be expressed as equation (14):

$$chkdn(x, y) = \begin{cases} 1 & \text{if any of (11), (12), or (13) is true} \\ 0 & \text{otherwise.} \end{cases} \quad (14)$$

When chkdn(x,y) takes a value of one, it's said that the direction d(x,y) can be extended to its neighboring lower row in the edge orientation map.

According to the length requirement for a valid edge, if both chkup(x,y) and chkdn(x,y) take a value of 1, i.e. chkup(x,y)+chkdn(x,y)=2, then the direction d(x,y) can be extended to both its neighboring upper row and neighboring lower row. Therefore, d(x,y) meets the length requirement. If both chkup(x,y) and chkdn(x,y) take a value of 0, then d(x,y) does not meet the length requirement and it is invalid. In the case of chkup(x,y)+chkdn(x,y)=1, further checking is needed.

Assume that chkup(x,y)=1 and chkdn(x,y)=0. In this case, d(x,y) can be extended to its neighboring upper row, but not to its neighboring lower row in the edge orientation map. As shown in FIG. 8, assume $T_1=1$, then none of the directions at "C", "$C_l$" and "$C_r$" are consistent with the current direction at "A". In this case the checking process should go further up in the edge orientation map. Therefore, directions on row n−4 need to be checked.

The checking function used in this case is named as chkup2(x,y). This function takes a value of one if any of the following three cases shown in (15)~(17) is true:

$$|d(x,y)-f(x,y)| \leq T_1 \text{ and } chkup(x-2,c_u(x,y))=1 \quad (15)$$

$$|d(x,y)-f_l(x,y)| \leq T_1 \text{ and } chkup(x-2,c_u(x,y)-1)=1 \quad (16)$$

$$|d(x,y)-f_r(x,y)| \leq T_1 \text{ and } chkup(x-2,c_u(x,y)+1)=1 \quad (17).$$

Figure 11:
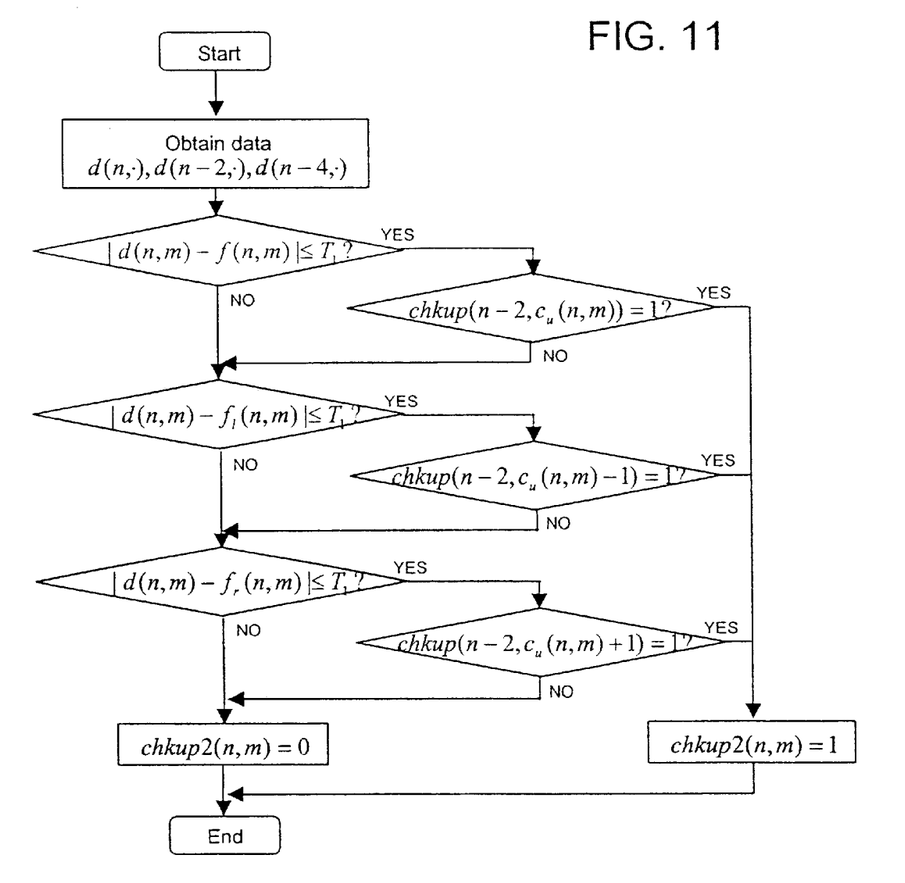
FIG. 11 is a flowchart of the flowchart of chkup2 process used to determine whether a direction can be extended to the two rows above it in an edge orientation map.

The flowchart of this checking process is shown in FIG. 11. The chkup2(x,y) function can be expressed as (18):

$$chkup2(x, y) = \begin{cases} 1 & \text{if any of (15), (16), or (17) is true} \\ 0 & \text{otherwise.} \end{cases} \quad (18)$$

When chkup2(x,y) takes a value of one, it means that the direction d(x,y) can be extended to both the row x−2 and x−4. Therefore, d(x,y) also meets the edge length requirement in this case. In FIG. 8, assume $T_1=1$, then the direction d(n,m) at the position of "A" can at least be extended to "$B_l$" and again from "$B_l$" to "D". So, chkup2(n,m)=1 and d(n,m) meets length requirement in this case.

In a similar way, when chkup(x,y)=0 and chkdn(x,y)=1, a checking function chkdn2(x,y) is defined for this case and it takes a value of one if any of the following three cases shown in (19)~(21) is true:

$$|d(x,y)-g(x,y)| \leq T_1 \text{ and } chkdn(x+2,c_d(x,y))=1 \quad (19)$$

$$|d(x,y)-g_l(x,y)| \leq T_1 \text{ and } chkdn(x+2,c_d(x,y)-1)=1 \quad (20)$$

$$|d(x,y)-g_r(x,y)| \leq T_1 \text{ and } chkdn(x+2,c_d(x,y)+1)=1 \quad (21)$$

Figure 12:
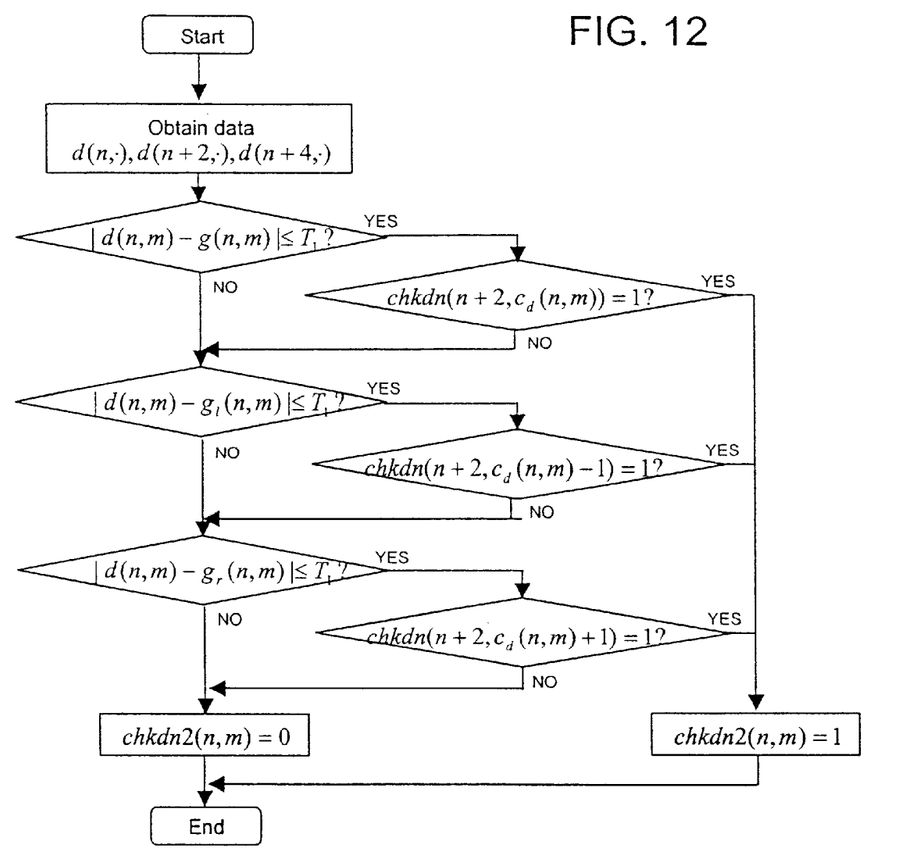
FIG. 12 is a flowchart of the chkdn2 process used to determine whether a direction can be extended to the two rows below it in an edge orientation map.

The flowchart of this checking process is shown in FIG. 12. The chkdn2(x,y) function can be expressed as in (22).

$$chkdn2(x, y) = \begin{cases} 1 & \text{if any of (19), (20), or (21) is true} \\ 0 & \text{otherwise.} \end{cases} \quad (22)$$

Based on the descriptions above, the direction length filtering conditions can be summarized as follows:

$$chkup(x,y)+chkdn(x,y)=2 \quad (23)$$

$$chkup2(x,y)=1 \quad (24)$$

$$chkdn2(x,y)=1 \quad (25).$$

When any condition in (23)–(25) is true, the direction d(x,y) is said to meet the direction length requirement. Assume that the direction length filtering result on $\{d(\bullet,\bullet)\}$ is $\{d_L(\bullet,\bullet)\}$, the flow chart of the direction length filtering process is shown in FIG. 13.

Figure 13:
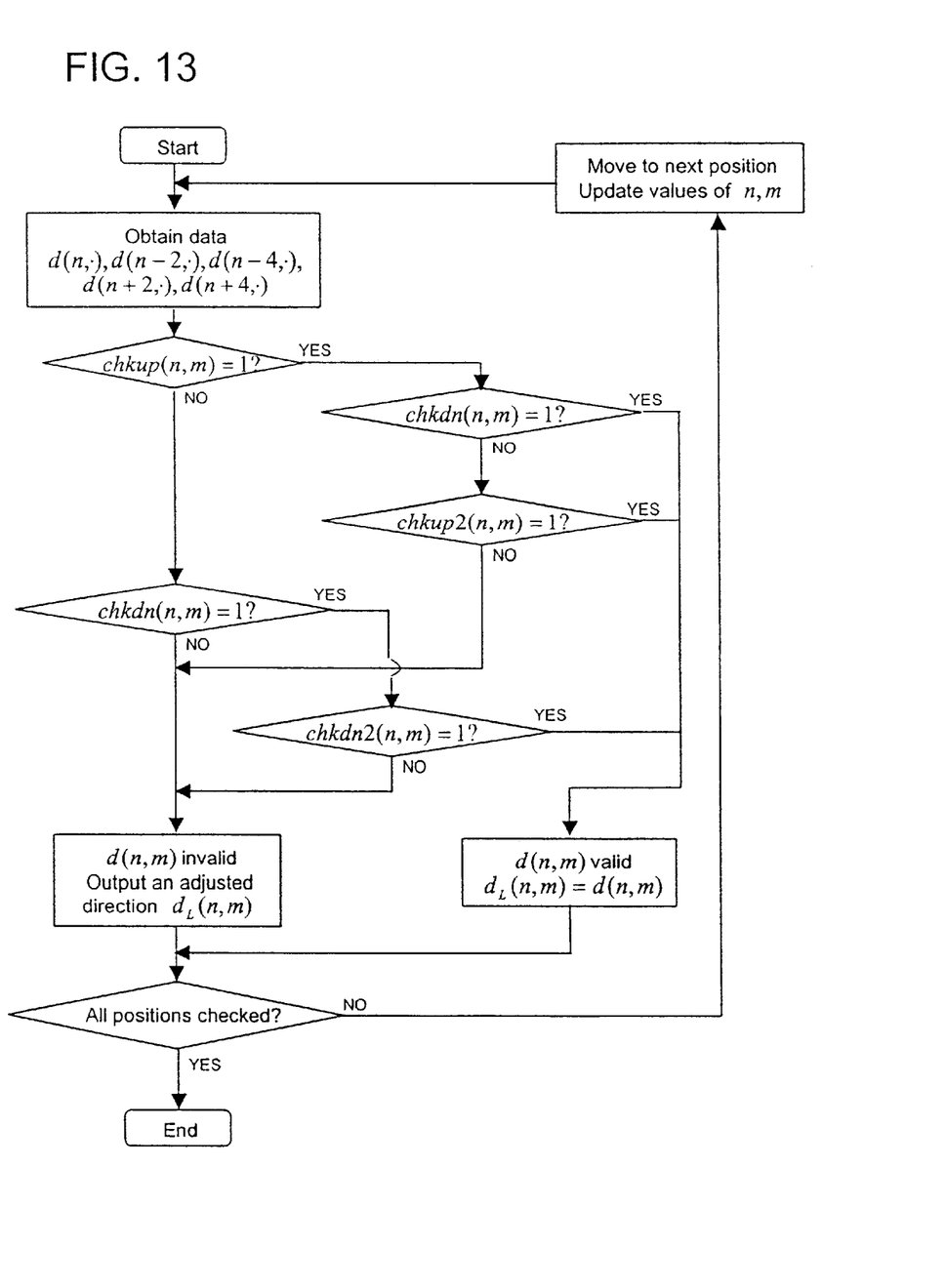
FIG. 13 is a flowchart of the direction length filtering process.

If a direction d(n,m) is valid according to the checking process shown in FIG. 13, then the output direction is the same as the current one and the checking process moves to the next position. If the current direction d(n,m) is invalid, then the output direction is set to an adjusted version of the current direction. For image de-interlacing or scaling purposes, the adjusted version of the output direction is simply the vertical direction if the current direction is invalid, i.e. $d_L(n,m)=0$.

It's found that the Direction Length Filter 1 is highly efficient in removing false edge directions by exploiting the correlation among neighboring directions along edge.

Figure 3:
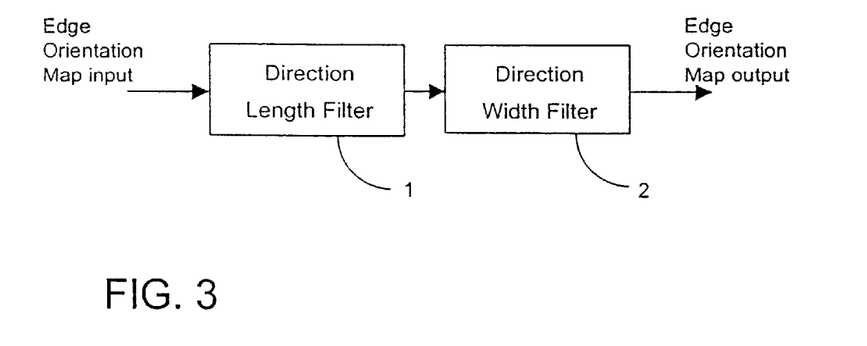
FIG. 3 is a block diagram of a second embodiment of the invention that includes a direction length filter and a direction width filter.

FIG. 3 shows a second embodiment of the invention that includes not only the Direction Length Filter 1, but also a Direction Width Filter 2. When the direction length filtering process is finished, a direction width filtering process is performed. The assumption underlying the direction width filtering is that an edge direction should have a certain width along the horizontal direction. In the invention, the width requirement for a valid edge is defined as: an edge having a width of three pixels or wider, i.e. the direction should have at least two neighboring directions in the same row with a similar orientation.

The width requirement for the position of pixel (n,m) can be expressed as the following three cases:

$$\max(|d(n,m)-d(n,m-1)|,|d(n,m+1)-d(n,m)|) \leq T_2 \quad (26)$$

$$\max(|d(n,m)-d(n,m-1)|,|d(n,m-1)-d(n,m-2)|) \leq T_2 \quad (27)$$

$$\max(|d(n,m+1)-d(n,m)|,|d(n,m-2)-d(n,m+1)|) \leq T_2 \quad (28).$$

$T_2$ is a threshold value greater than zero. When $T_2$ takes a small value, it requires that neighboring edge directions shown in (26), (27) or (28) should have very similar orientations to each other. If $T_2$ equals to zero, it requires that neighboring edge directions have exactly the same orientation. The value of $T_2$ should be chosen in a way that it's small enough to verify correlations of neighboring edge directions, but not too small to allow slightly different directions to remain.

As shown in FIG. 8, condition (26) requires that "A", "$A_l$" and "$A_r$" have similar edge directions. Similarly, condition (27) requires that "A", "$A_l$" and "$A_{ll}$" have similar edge directions. Condition (28) requires that "A", "$A_r$" and "$A_{rr}$" have similar edge directions.

For the position of pixel (n,m), if the condition in any one of (26), (27) or (28) is true, then d(n,m) is said to meet the direction width requirement. Assume that the direction width filtering result on $\{d(\bullet,\bullet)\}$ is $\{d_W(\bullet,\bullet)\}$. The flow chart for the direction width filtering process that insures that the edge direction has the required width is shown in FIG. 14.

Figure 14:
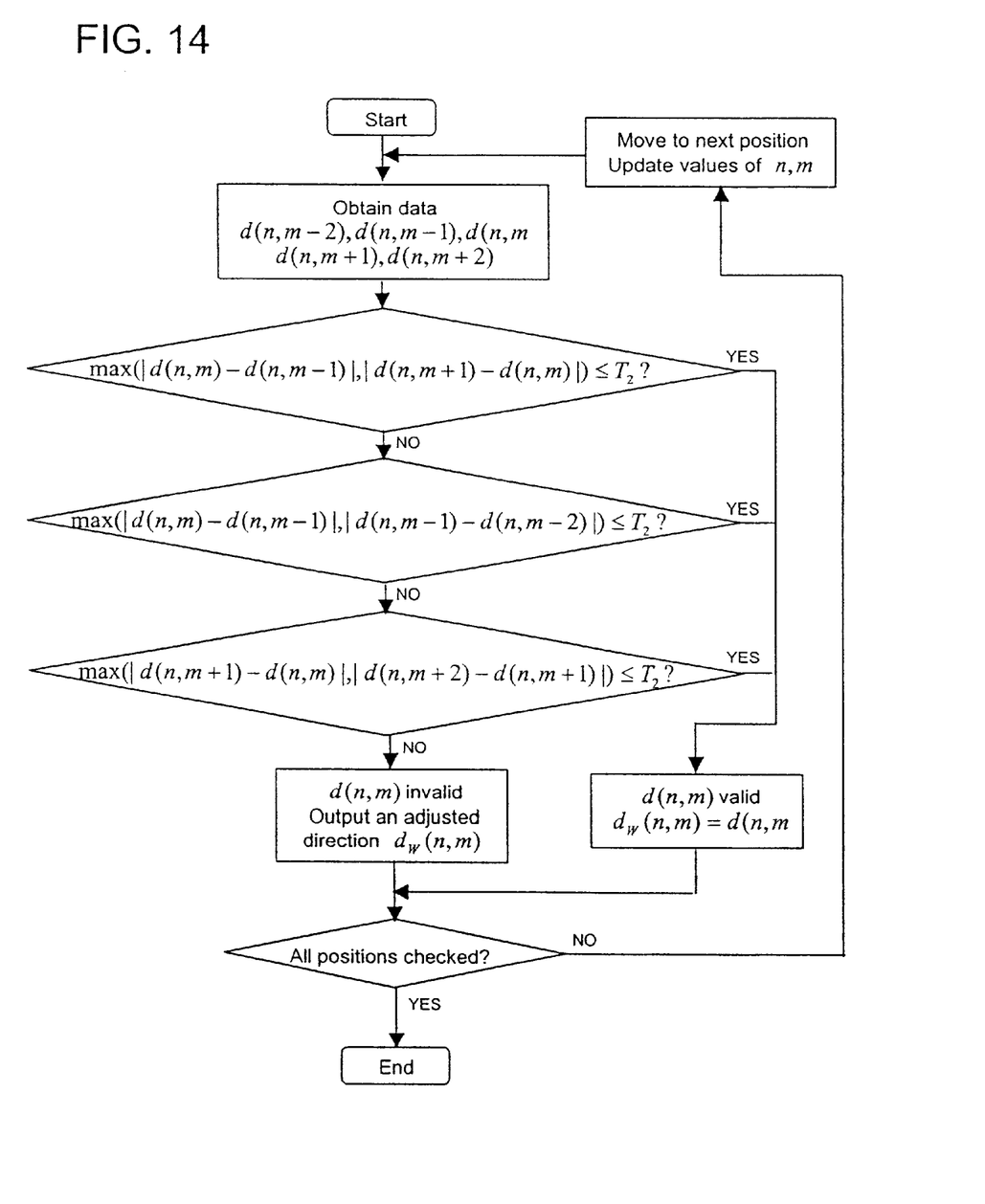
FIG. 14 is a flowchart of the direction width filtering process.

If a direction d(n,m) is valid according to the width filtering process shown in FIG. 14, then the output direction is the same as the current one and the checking process moves to the next position. If the current direction d(n,m) is invalid, then the output direction is an adjusted version of the current direction. For image de-interlacing or scaling purposes, the output direction can be simply set to the vertical direction if the current direction is invalid, i.e. $d_W(n,m)=0$.

Similar to Direction Length Filter 1, the Direction Width Filter 2 also utilizes the correlation among neighboring directions, but it does this along the horizontal direction instead of the edge direction. When the Direction Width Filter 2 is combined with the Direction Length Filter 1 in a system, it further improves the system's capability to filter out false edge directions in an edge orientation map.

Figure 4:
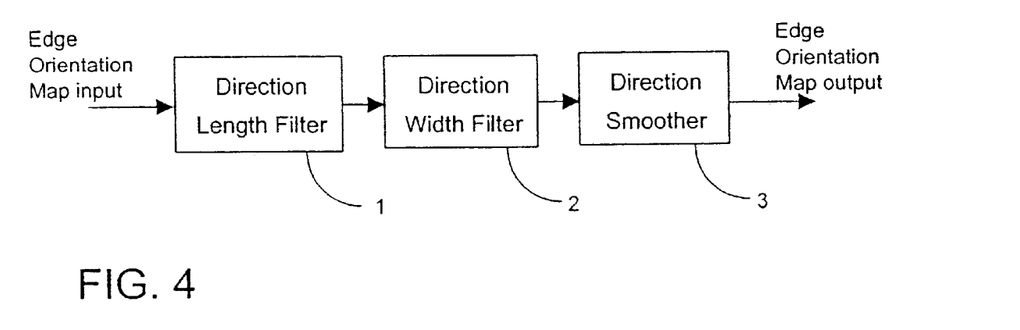
FIG. 4 is a block diagram of a third embodiment of the invention that includes a direction length filter, a direction width filter, and a direction smoother.

FIG. 4 shows a third embodiment of this invention that includes both the Direction Length Filter 1 and the Direction Width Filter 2, and in addition, a Direction Smoother 3. In this system, the Direction Length Filter 1 and the Direction Width Filter 2 serve to effectively remove false edge directions from an edge orientation map. The functionality of the Direction Smoother 3 is to smooth the transition of neighboring edge directions.

The Direction Smoother 3 is basically a 3-tap low pass filter. Assume the direction smoothing result on $\{d(\bullet,\bullet)\}$ is $\{d_S(\bullet,\bullet)\}$. The Direction Smoother 3 can be expressed as the following equation (11):

$$d_S(n,m)=(d(n,m-1)+2*d(n,m)+d(n,m+1))/4 \quad (29).$$

This process is found to be effective in improving the visual quality of the interpolated image.

I claim:

1. A method for filtering an edge direction, the method which comprises:

in a given row in an edge orientation map, selecting a given pixel having an edge direction;

finding neighboring upper pixels having neighboring upper edge directions for the given pixel by traversing along the edge direction of the given pixel from the given pixel to a neighboring upper row of the edge orientation map;

finding neighboring lower pixels having neighboring lower edge directions for the given pixel by traversing along the edge direction of the given pixel from the given pixel to a neighboring lower row of the edge orientation map;

determining whether the edge direction of the given pixel can be extended to the neighboring upper row by checking an orientation similarity between the edge direction of the given pixel and the neighboring upper edge directions;

determining whether the edge direction of the given pixel can be extended to the neighboring lower row by checking an orientation similarity between the edge direction of the given pixel and the neighboring lower edge directions;

if the edge direction of the given pixel can be extended to both the neighboring upper row and the neighboring lower row, then assuming that the edge direction of the given pixel is valid;

if the edge direction of the given pixel cannot be extended to the neighboring lower row, but the edge direction of the given pixel can be extended to one of the neighboring upper pixels, and a neighboring upper edge direction at the one of the neighboring upper pixels can be extended to a further neighboring upper row of the edge orientation map, then assuming that the edge direction of the given pixel is valid;

if the edge direction of the given pixel cannot be extended to the neighboring upper row, but the edge direction of the given pixel can be extended to one of the neighboring lower pixels, and a neighboring lower edge direction at the one of the neighboring lower pixels can be extended to a further neighboring lower row of the edge orientation map, then assuming that the edge direction of the given pixel is valid; and otherwise, assuming that the edge direction of the given pixel is not valid.

2. The method according to claim 1, wherein:

the edge direction of the given pixel (x,y) is represented by d(x,y);

the step of finding the neighboring upper pixels includes using equations:

$f(x,y)=d(x-2,c_u(x,y))$, $f_l(x,y)=d(x-2,c_u(x,y)-1)$, and $f_r(x,y)=d(x-2,c_u(x,y)+1)$, where $c_u(x,y)=y+d(x,y)*2$; and the step of finding the neighboring lower pixels includes using equations:

$g(x,y)=d(x+2,c_d(x,y))$, $g_l(x,y)=d(x+2,c_d(x,y)-1)$, and $g_r(x,y)=d(x+2,c_d(x,y)+1)$, where $c_d(x,y)=y-d(x,y)*2$.

3. The method according to claim 2, wherein:

the step of checking the orientation similarity between the edge direction of the given pixel and the neighboring upper edge directions includes:
a) defining a checking function chkup(x,y) as follows:

$$chkup(x, y) = \begin{cases} 1 & \text{if } |d(x, y) - f(x, y)| \le T_1 \text{ or} \\ & |d(x, y) - f_l(x, y)| \le T_1 \text{ or} \\ & |d(x, y) - f_r(x, y)| \le T_1 \\ 0 & \text{otherwise} \end{cases}$$

b) concluding that the edge direction of the given pixel can be extended to the neighboring upper row if chkup(x,y) equals one; and the step of checking the orientation similarity between the edge direction of the given pixel and the neighboring lower edge directions includes:
a) defining a checking function chkdn(x,y) as follows:

$$chkdn(x, y) = \begin{cases} 1 & \text{if } |d(x, y) - g(x, y)| \le T_1 \text{ or} \\ & |d(x, y) - g_l(x, y)| \le T_1 \text{ or} \\ & |d(x, y) - g_r(x, y)| \le T_1 \\ 0 & \text{otherwise} \end{cases}$$

b) concluding that the edge direction of the given pixel can be extended to the neighboring lower row if chkdn(x,y) equals one;

where $T_1$ is a threshold value chosen to be greater than zero and small enough to verify correlations of neighboring edge directions, but not small enough such that slightly different directions will remain.

4. The method according to claim 2, which comprises:
defining a checking function chkup2(x,y) as:

$$chkup2(x, y) = \begin{cases} 1 & \text{if } (|d(x, y) - f(x, y)| \le T_1 \text{ and } chkup(x-2, c_u(x, y)) = 1) \text{ or} \\ & (|d(x, y) - f_l(x, y)| \le T_1 \text{ and } chkup(x-2, c_u(x, y) - 1) = 1) \text{ or} \\ & (|d(x, y) - f_r(x, y)| \le T_1 \text{ and } chkup(x-2, c_u(x, y) + 1) = 1) \\ 0 & \text{otherwise} \end{cases}$$

defining a checking function chkdn2(x,y) as:

$$chkdn2(x, y) = \begin{cases} 1 & \text{if } (|d(x, y) - g(x, y)| \le T_1 \text{ and } chkdn(x+2, c_d(x, y)) = 1) \text{ or} \\ & (|d(x, y) - g_l(x, y)| \le T_1 \text{ and } chkdn(x+2, c_d(x, y) - 1) = 1) \text{ or} \\ & (|d(x, y) - g_r(x, y)| \le T_1 \text{ and } chkdn(x+2, c_d(x, y) + 1) = 1) \\ 0 & \text{otherwise} \end{cases}$$

if the checking function chkup2(x,y) takes a value of one, concluding that the neighboring upper edge direction at the one of the neighboring upper pixels can be extended to the further neighboring upper row of the edge orientation map; and if the checking function chkdn2(x,y) takes a value of one, concluding that the neighboring lower edge direction at the one of the neighboring lower pixels can be extended to the further neighboring lower row of the edge orientation map.

5. The method according to claim 1, which comprises: if the edge direction of the given pixel is within a threshold value from two horizontally neighboring directions in the given row, then making a final conclusion that the edge direction of the given pixel is valid.

6. The method according to claim 1, which comprises: checking a width of the edge direction of the given pixel by determining an orientation similarity between the edge direction of the given pixel and two horizontally neighboring directions in the given row.

7. The method according to claim 6, wherein:

the edge direction of the given pixel (x,y) is represented by d(x,y); and the step of checking the width of the edge direction of the given pixel includes using equations:

$\max(|d(x,y)-d(x,y-1)|,|d(x,y+1)-d(x,y)|) \le T_2$, $\max(|d(x,y)-d(x,y-1)|,|d(x,y-1)-d(x,y-2)|) \le T_2$, and $\max(|d(x,y+1)-d(x,y)|,|d(x,y+2)-d(x,y+1)|) \le T_2$, where $T_2$ is a threshold value chosen to be greater than zero and small enough to verify correlations of neighboring edge directions, but not small enough such that slightly different directions will remain.

8. The method according to claim 1, which comprises:
performing a filtering process to smooth a transition between neighboring edge directions.

9. The method according to claim 8, which comprises:
using a three-tap filter for the filtering process; and
implementing the three-tap filter using equation:

$d_s(x,y)=(d(x,y-1)+2*d(x,y)+d(x,y+1))/4$, where $d_s(x,y)$ is a filtered output direction.

10. An edge direction filtering system, comprising:

a direction length filter for extending a current edge direction to neighboring upper rows and to neighboring lower rows in an edge orientation map;

said direction length filter for checking an orientation similarity between the current edge direction and neighboring edge directions located along the current edge direction; and said direction length filter for indicating that the current edge direction is valid if the current edge direction can be extended to a certain number of neighboring rows in the edge orientation map.

11. The edge direction filtering system according to claim 10, comprising:

a direction width filter for filtering the current edge direction along a horizontal direction;

said direction width filter for checking an orientation similarity between the current edge direction and neighboring edge directions on a row with the current edge direction in an edge orientation map; and said direction width filter for indicating that the current edge direction is valid if a certain number of consecutive ones of the neighboring edge directions on the row with the current edge direction have a similar orientation to the current edge direction.

12. The edge direction filtering system according to claim 11, comprising: a low pass filter for smoothing transitions between horizontally neighboring edge directions of the edge orientation map.

* * * * *